Jan. 7, 1930.  F. W. MANNING  1,742,919
MAGAZINE FILTER
Filed June 19, 1926
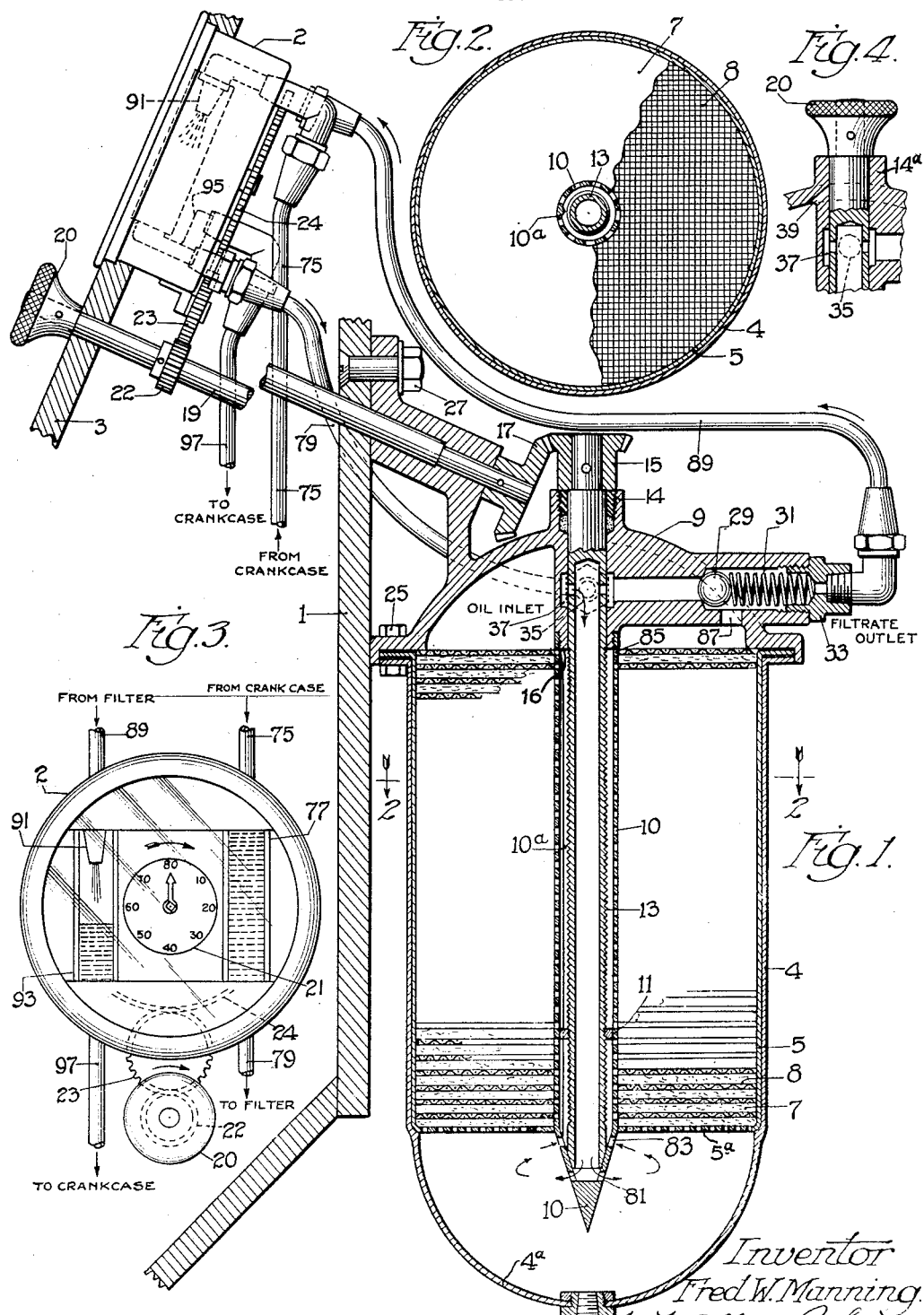
Inventor
Fred W. Manning
by Wallace R. Lane
Atty Patented Jan. 7, 1930

1,742,919

UNITED STATES PATENT OFFICE

FRED W. MANNING, OF BERKELEY, CALIFORNIA, ASSIGNOR TO STEWART-WARNER CORPORATION, OF CHICAGO, ILLINOIS, A CORPORATION OF VIRGINIA

MAGAZINE FILTER

Application filed June 19, 1926. Serial No. 117,045.

This invention relates to the treatment of liquids for effecting their purification or other desired improvements in their chartertistics, such as a method and means for the purification of motor lubricating oils of internal combustion engines during their operation, by passing such oils through suitable filter fabrics or other treating agents.

In the continued operation of internal combustion engines, particularly of the automobile type, the lubricating oil becomes contaminated with solid impurities such as road dust, metal particles, fine particles of free carbon, etc. Various types of filters are useful for removing the coarser solids but in order that such filters may have a reasonable life of service, their filter fabrics must be of sufficiently open texture or porosity to prevent the early clogging action which would be caused by the retention of the finer solid impurities. Consequently the passage of the finer solid particles gradually allows the oil to become darker and ultimately makes necessary that it be discarded altogether. Thus, the operator is not only compelled to waste the greater part of the oil purchased but not having any means whereby he can determine when the oil should be changed, often neglects to do so at suitable periods, with the result that there is more or less befouling of spark plugs, valve seats, oil holes, etc., which is a much more serious consideration than even the loss of the oil.

In my previous applications, Serial Numbers 59,787; 64,247; 64,495; 70,111; 75,003, and 105,265, filed Oct. 1, 1925; Oct. 22, 1925; Oct. 24, 1925; Nov. 19, 1925; Dec. 12, 1925 and April 28, 1926, respectively, I have described various types of magazine filters, which, equipped with suitable treating material, will clarify contaminated oil in its first passage therethrough, and which material as it becomes clogged may be continuously removed and replaced by fresh material, thus eliminating any wastage of oil and reducing deposition of carbon, etc., in the engine, to a minimum.

It is, therefore, an object of this invention to provide a novel gauge whereby an automobile driver or other operator of an internal combustion engine, by simply glancing at the gauge, may determine the condition of the oil in the crankcase, the speed with which the oil is passing through the filter, and the amount of reserve filter fabric or other treating agent there is in the filter.

It is also an object of this invention to incorporate with the gauge preferably located on the instrument board of an automobile or other suitable place, a regulating device which will enable the driver to bring into use fresh filter fabric or other treating material as required, and if for any reason the crankcase oil should become darker in color, the operating of the regulator will enable the driver to bring the oil back to desired clarity in a comparatively short time.

It is a further object of this invention to provide a magazine type of filter whereby instead of removing the filter fabric or other treating material as it becomes clogged or exhausted, the oil is forced through one portion of the treating material until it becomes clogged and then by operating the regulator may be forced through a fresh portion, as by being by-passed around the exhausted portion.

The invention comprehends other features, objects, advantages and capabilities as will later appear and are inherently possessed by the invention.

With the above and other objects in view, the invention will be understood, by reference, to the following description, taken in conjunction with the accompanying drawings which show illustrative embodiments of the invention.

Referring to the drawings, Fig. 1 is a section through the center of a by-pass type of magazine filter showing its connections to the oil filter gauge on the instrument board of an automobile.

Fig. 2 is a horizontal sectional view of the filter taken in a plane represented by line 2—2 of Fig. 1 of the drawings.

Fig. 3 is a front view of the oil filter gauge connected to the filter shown in Fig. 1.

Fig. 4 is a fragmentary view partly in section and partly in elevation of an alternate form of by-pass regulator used when the filter by-pass arrangement is adjusted at the filter instead of the instrument board.

Fig. 5 is a section through the center of a winding type of magazine filter showing its connections to the oil filter gauge on the instrument board of an automobile.

Fig. 6 is a horizontal sectional view of the filter taken in a plane represented by line 6—6 in Fig. 5 of the drawings.

Fig. 7 is a front view of the oil filter gauge connected to the filter shown in Fig. 5.

Referring more specifically to the drawings showing illustrative embodiments of the invention, the form shown in Figs. 1, 2 and 3 is a by-pass type of magazine filter and is attached to a cowl 1 of a motor car and connected to a magazine filter gauge 2 on an instrument board 3 of the car. The filter comprises a filter casing 4 forming a container for a refill cylinder 5 having a perforated bottom 5ª, and a lower portion 4ª of the casing forms a sump in which is fitted a suitable cleanout plug 6. The refill preferably comprises filter disks, or pads, or sections 7, composed of suitable filter or treating agents such as asbestos, cotton fibre, paper pulp, fuller's earth, kieselguhr, etc., or a mixture of them, suitable for clarification, decolorization and for other purposes, and these are interposed with drainage screens or other suitable drainage members 8, the upper one of which may be clamped down by a casing cover 9. A by-pass pipe 10 may be attached to a central boss 35 of the cover, and provided with perforations or openings opposite the drainage members 8. The pipe may be crimped at 10ª to prevent a by-pass baffle 11 from turning. The baffle 11 may be moved back and forth in pipe 10 by the rotation of a feed pipe 13 which is in threaded engagement with the baffle 11. Pipe 13 extends through a stuffing box 14 and has secured to its outer end a gear 15 which is driven by a gear 17 secured to an end of an adjusting shaft 19. The adjusting shaft projects through the instrument board 3 and has a manual knob 20, each turn of which may be registered on a dial 21 by way of a gear 22 secured to the shaft 19, idler 23 and a dial gear 24 operatively connected to a dial indicator. The flanges of the filter casing, refill cylinder and cover, with suitable gaskets therebetween, are fastened together by means of bolts 25, and the cover is bolted to cowl 1 by means of bolts 27.

The cover 9 carries a by-pass valve 29 loaded by spring 31, both of which are enclosed in an outlet fitting 33, the valve allowing the oil entering an inlet 35 and annular chamber 37 to be by-passed out through the filtrate line should the pressure within the chamber rise above a predetermined point.

In Fig. 4 is shown an alternate device for operating the by-pass means and it comprises a knob 20 adapted for securement to the upper end of the pipe 13, in lieu of the gear 15. This arrangement is capable of operation by direct turning of the knob when the instrument board arrangement is not used or desired. It has the advantage of enabling the operator to ascertain the amount of unused filter element in the casing which may be done by manually withdrawing the pipe, 13, until the baffle, 11, encounters the center boss, 16, of the cover, 9; and the length of pipe then appearing above the boss, 14ª, will indicate the aggregate thickness of the unused elements. The filtered oil may be discharged downwardly and may not completely fill the filtrate receiving chamber formed on the inside of the filter chamber cover. In such case the stuffing box 14 would not be required and any oil entering the filter at 35 and tending to creep upward from the annular chamber 37 would be drained backward into the filtrate receiving chamber through channel 39.

Figs. 5, 6 and 7 illustrate a winding type of magazine filter attached to the cowl 1 of a motor car and connected a magazine filter gauge 2 on the instrument board 3 of the car. It comprises a filter casing 41 containing filter fabric windings 43 which may or may not be coated or impregnated with treating agents such as those mentioned above. The refill windings are wrapped in the form of an annular ring on the inside of a perforated refill cylinder 45, the beaded ends of which prevent contact between the cylinder and the filter casing and afford drainage for the filtered oil, which passes into the outlet fitting through opening or passage 46. The top cover 47 is bolted to cowl 1 by means of cap nut 49, gasket 51, and the hollow bolt 53 screwed into the sump end of filter casing. The perforated refill cylinder is also held in position between the flanged shoulder in the filter casing and the casing cover by the same bolt and cap nut and its upper and lower end joints are made tight by gaskets 51 and 55. The hollow bolt 53 whose lower end is closed by plug 57, also supports by means of pin 58 a circular perforated plate 59 used to prevent sagging of the windings, as they are wound upon a hollow spool 61. This spool, by means of notched teeth in its upper end, is rotated by driver spool 63 to which is fastened a gear 65 driven by a gear 67 on the end of adjusting shaft 19, the latter passing through a stuffing box 69. The adjusting shaft projects through the instrument board 3 and has a regulator knob 20, the manual operation of which will effect registration on dial 21ª through the medium of gears 22, 23 and 24. The by-pass valve 29 and leading spring 31 enclosed in the fitting 33, allows the oil which enters the filter chamber through inlet 71, annular chamber 73, hollow bolt 53 and the bolt outlet openings 74, to be by-passed out through the filtrate line should the pressure within the filter chamber rise above a predetermined point.

The operations of the illustrative embodiments are similar and have been, in part, indicated in connection with the foregoing description. Referring first to the arrangements shown in Figs. 1, 2 and 3, oil pumped from the crankcase through the lubricating system is by-passed at some convenient point and carried through pipe line 75 to the oil filter gauge, through sight glass 77, out of the gauge and through pipe line 79 to the filter, which it enters through inlet 35, annular chamber 37 and filter feed pipe 13. The incoming oil flows downwardly through the feed pipe, enters the upper part of the sump in a horizontal direction through openings 81 in the perforated by-pass pipe, without disturbing the solid impurities which have already settled, and re-enters the by-pass pipe through openings 83, up which it flows until reaching the baffle 11. The baffle 11 opposes the continued upward flow of the oil in the pipe 10 and causes it to flow out of the perforations in the by-pass pipe 10 into the adjacent distributing and drainage member immediately below the baffle, then upwardly through a layer or section of filtering or treating material 7, into a succeeding distributing and drainage member. The filtered oil then flows back into the by-pass pipe through perforations therein just above the baffle 11 and again flows upwardly and finally through the top perforations or openings in the by-pass pipe into the receiving chamber, in the cover 9, leading to the fitting 33 and duct 89. The position of the baffle determines the number of filter sections the oil is forced through. The filtered oil leaves the filtrate receiving chamber by opening 87 and outlet fitting 33, and flows through pipe line 89 to the oil filter gauge, where it is forced through a nozzle 91, sight glass 93, goose-neck channel 95 in the gauge, and returns to the crank case through pipe line 97. The goose-neck channel maintains a certain height of filtered oil in the left hand sight glass for convenience in comparing the filtered oil with the crankcase oil in the right hand sight glass. A comparatively large channel and down flow pipe to the crank case will cause the flow through the channel to be steady and prevent any tendencies to siphoning.

As a layer or section of filtering or treating material becomes clogged the oil may be by-passed around it and forced through fresh treating material by means of turning the regulator to raise the baffle to cause the flow of the oil through a fresh section. The registering dial is designed to indicate the amount of reserve treating material, or if an instrument board is not used, the amount of reserve can be determined by simply using the regulator shown in Fig. 4 to raise the feed pipe until the baffle strikes the center boss of the cover 9. After all of the reserve material has been used up the baffle is returned to its lowest position, the filter casing disconnected, the refill cylinder and the settlings in the sump dumped out, a new refill cylinder dropped into place, and the casing again bolted to its cover support. The lifting of the casing into position will cause the pointed end of the by-pass pipe to crowd the treating material, whether in pads or loose form into a compact position around the circumference of the by-pass pipe thus preventing upward passage of unfiltered oil at that point.

Referring now to the arrangement shown in Figs. 5 and 7, as in the previous case oil pumped from the crankcase through the lubricating system is by-passed at some convenient point and carried through the pipe line 75 to the oil filter gauge, through sight glass 77, from the gauge and through the pipe line 79 to the filter, the oil entering through inlet 71 and annular chamber 73, and, after passing downwardly through the hollow bolt 53, entering the upper part of the sump in a horizontal direction through openings 74 without disturbing the solid impurities already settled therein. The oil then rising upwardly, filters radially outward through the annular windings of treating material, flows through the perforated refill cylinder and into the drainage space between the cylinder and the casing. The filtered oil leaves this drainage space by outlet 46, and flows through outlet fitting 33, pipe line 89 to the filter gauge, where it passes through nozzle 91, sight glass 93, gooseneck channel 95, and finally returns to the crankcase through pipe line 97.

Whether the solid impurities build up on the first winding or are distributed throughout the windings will depend upon the treating fabric or material used. The best results will usually be obtained by using a material whose filtering characteristics are such that the passage of oil through one or a few thicknesses or windings will give complete clarity. The reserve windings will then offer little resistance to the clarified or otherwise treated oil. The turning of the regulator will cause the clogged or exhausted windings to be removed from the next winding of the annular roll or reserve treating material and wound upon the winding spool 61 to expose an unclogged section to the oil to be filtered. After all the reserve windings have been thus utilized, the cap nut 49 is removed, the filter casing 41 dropped together with associated parts, and the refill and the settlings in the sump dumped out. Then a new refill is dropped into place, and the casing again bolted to the cover support. The refill may be supplied within its perforated cylindrical container 45 and with the internal end of the windings attached by shellac or otherwise to the winding spool, or the annular roll of windings may be supplied independent of its cylindrical container 45 and also the winding spool, both of which would be then considered as permanent parts of the filter.

When the oil is cold the resistance of the filtering material to its passage will be greatest and consequently the entrance of the oil into the upper part of the sump and its upward flow to the by-pass valve will cause the greater portion of the cold oil to be by-passed through the valve 29 until the engine warms up. The settlings should not be disturbed or heated more than is necessary.

The pressure regulating valve inserted in the filtrate outlet line of either type of filter may be adjusted to regulate the differential of pressure required to force oil through the filtering or treating material. If desired, the filtered oil, instead of being returned to the crankcase, may be returned to the pipe lines of the lubricating system or forced to some of the bearings in which case all the lines and connections conveying filtered oil will be under pressure, and the nozzle in the filtered oil sight glass and the goose-neck channel will not be required. If the lubrication of the motor parts is accomplished by a splash system without the aid of pump pressure, then this differential will have to be obtained by means of a vacuum tank in conjunction with a float arrangement or else a special pump must be installed. A restricted orifice in the filtrate outlet fitting 33 or in the gauge nozzle 91 may serve as a regulating means and will prevent an excessive flow of oil through the by-pass filter system, which might be occasioned by an exceedingly porous treating material, or by the complete utilization of the reserve material.

It will be obvious from the foregoing description that the driver of a car equipped with a magazine filter gauge on the instrument board and connected to a magazine filter of either type, preferably attached to the cowl, will be able to observe and control, at all times, the condition of his crankcase oil, and by always maintaining a perfectly clean oil in his crankcase he may prevent any wastage and avoid most engine troubles, the great majority of which are due to faulty lubrication. For instance, if he should be traveling over moderately dusty roads he may require a filter equipped with one hundred windings or sections of treating material to keep the oil in a perfectly clarified condition for the distance of five thousand miles, in which case he should turn the regulator to take up given lengths of winding or a section every fifty miles. If he fails to do this the darkening of his crankcase oil as indicated in the right hand or crankcase oil sight glass and compared with the clarity of the oil in the left hand or filtered oil sight glass will very soon warn him that he should turn the regulator, or that he should turn it more frequently. If he does not wish to take the trouble every fifty miles or say once a day to give the regulator a turn then the re-fill may be made up so that several windings or sections of filter material are necessary to give complete clarity to the oil, in which case such number of windings will have to be removed or such number of sections will have to be brought into service at one time, and then it would only be necessary for the driver to touch the regulator once every several hundred miles.

It will also be evident that a car traveling over clean roads and equipped with a motor and using an oil which forms little carbon, will require much less filtering or treating material than if the conditions were otherwise, and consequently the only possible way to obtain the maximum service from the filter material under any condition, is for the driver to regulate the supply in accordance with the indications of the filter gauge glasses. The dial between the glasses will always accurately indicate the amount of reserve filtering material in the filter and the speed with which it is being used up, and the graduations may be made to represent either sections or windings, or linear feet of windings. These gauges preferably may be open at the back or provided with openings and means for the transmission of light through the gauge glasses for the greater facility of visual inspection thereof.

It will still further be evident that although the reserve treating material in a magazine filter may take many different forms, yet the material must be brought into use either by substituting furnished material for the exhausted material so that the oil may pass through fresh material, or else by changing the path of flow of oil so that the oil may pass through the fresh material.

While I have herein described and upon the drawings shown illustrative embodiments of the invention, it is to be understood that the latter is not limited thereto but may comprehended other constructions, features, details and arrangement of parts without departing from the spirit thereof.

Having thus disclosed the invention, I claim:

1. A fluid purifying device comprising a filter chamber closed at both ends; a transversely extending series of layers of filtering material, and alternating therewith layers of spacing material freely pervious to the fluid to be treated, all said layers being contained in said chamber and being apertured in alignment longitudinally of the chamber; a tube extending through the aligned apertures, said tube being apertured at transverse zones spaced apart along its extent in the chamber correspondingly to the spacing layers, the tube being mounted fixedly in the chamber with its said apertured zones registering with the spacing layers respectively, an inlet pipe for the fluid to be treated of less exterior diameter than the interior diameter of the first mentioned pipe and extending within the latter, both said pipes communicating at one end with the cavity of the chamber beyond the layers, the inlet pipe having communication at the opposite end for inflow of the fluid to be treated, and the chamber having outlet connection at said opposite end beyond the last filtering and spacing layers at that end, and means for feeding the fluid to be treated through the structure from inlet to outlet of the chamber.

2. In the construction defined in claim 1, an annular baffle positioned between the two pipes for compelling the fluid entering between them from the first mentioned end of the chamber to pass out and through at least one filtering layer in order to by-pass said baffle and move on through the chamber toward the outlet.

3. In the construction defined in claim 1, the inner of said two pipes being exteriorly threaded and rotatably mounted, and the annular baffle being slidably and non-rotatably fitted within the outer pipe and engaged with the thread of the inner pipe, and means for rotating the threaded pipe to adjust the baffle along said pipes.

4. In the construction defined in claim 1, the inner of said two pipes being exteriorly threaded and rotatably mounted, and the annular baffle being slidably and non-rotatably fitted within the outer pipe and engaged with the thread of the inner pipe, and manually operable means for rotating the threaded pipe to adjust the baffle along said pipes.

5. In the construction defined in claim 1, a source of fluid to be treated and a pipe circuit from and back to said source, in which circuit the filter chamber is contained, and a passage connected in said circuit by-passing the filter chamber.

6. In combination with the lubricating system of an internal combustion engine, a filter, a filter material indicator means actuated from an instrument board for renewing the filter element, and other means operating in unison therewith to actuate the indicator, whereby the amount of reserve material in the filter is indicated.

7. In combination with the lubricating system of an internal combustion engine, a filter, a filter material indicator means actuated from an instrument board for substituting fresh filter material for contaminated filter material, and other means operating in unison therewith to actuate the indicator, whereby the amount of reserve material in the filter is indicated.

8. In combination with the lubricating system of an internal combustion engine, a filter, means actuated from an instrument board for substituting fresh filter material for contaminated filter material, and other means on the instrument board operating in unison therewith to indicate the amount of reserve fresh filter material.

In witness whereof, I hereunto subscribe my name to this specification.

FRED W. MANNING.

CERTIFICATE OF CORRECTION.

Patent No. 1,742,919.                                                   Granted January 7, 1930, to

FRED W. MANNING.

It is hereby certified that error appears in the printed specification of the above numbered patent requiring correction as follows: In the drawings, sheet 2, containing Figures 5, 6 and 7, should appear as shown below as part of the patent;

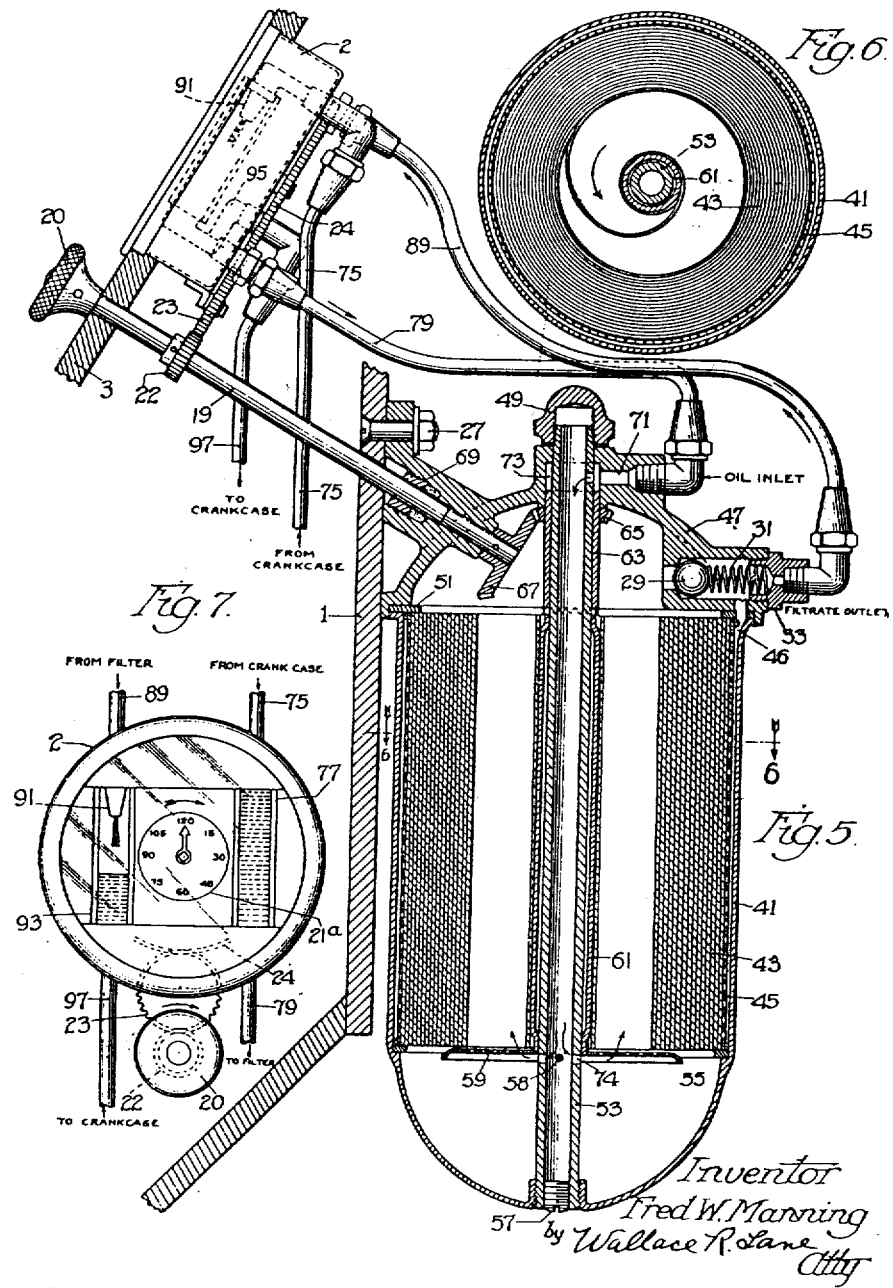

and that the said Letters Patent should be read with this correction therein that the same may conform to the record of the case in the Patent Office.

Signed and sealed this 1st day of April, A. D. 1930.